United States Patent
Watanabe

(10) Patent No.: US 12,475,000 B2
(45) Date of Patent: Nov. 18, 2025

(54) DATA BACKUP SYSTEM AND METHOD WITH DATA CONSISTENCY USING ASYNCHRONOUS DATA COPY

(71) Applicant: HITACHI, Ltd., Tokyo (JP)

(72) Inventor: Satoru Watanabe, Santa Clara, CA (US)

(73) Assignee: HITACHI VANTARA, LTD., Yokohama (JP)

( * ) Notice: Subject to any disclaimer, the term of this patent is extended or adjusted under 35 U.S.C. 154(b) by 37 days.

(21) Appl. No.: 18/443,668

(22) Filed: Feb. 16, 2024

(65) Prior Publication Data
US 2025/0265158 A1    Aug. 21, 2025

(51) Int. Cl.
*G06F 11/14* (2006.01)

(52) U.S. Cl.
CPC ...... *G06F 11/1464* (2013.01); *G06F 11/1451* (2013.01)

(58) Field of Classification Search
CPC .......... G06F 11/1464; G06F 11/1451
See application file for complete search history.

(56) References Cited

U.S. PATENT DOCUMENTS

| | | | |
|---|---|---|---|
| 6,070,197 A | 5/2000 | Cobb et al. | |
| 7,065,589 B2 | 6/2006 | Yamagami | |
| 7,278,049 B2 | 10/2007 | Bartfai et al. | |
| 9,069,708 B2 | 6/2015 | Gill et al. | |
| 2019/0332267 A1* | 10/2019 | Muniswamy-Reddy | G06F 3/065 |
| 2023/0350801 A1* | 11/2023 | Bhargava M.R. | G06F 3/0608 |

* cited by examiner

*Primary Examiner* — Bryce P Bonzo
*Assistant Examiner* — Audrey Emma Whitesell
(74) *Attorney, Agent, or Firm* — PROCOPIO, COREY, HARGREAVES & SAVITCH LLP

(57) ABSTRACT

Backup systems and methods create consistent backups across multiple data sets, while integrating ADC technology. To accomplish this, an application group ADC configuring function (APG-ADC configuring function) configures the ADC to ensure that backup data sets remain consistent with those at the original source. The APG-ADC configuring function configures ADC such as to update backup data sets in the same order as the original data sets.

9 Claims, 15 Drawing Sheets

| VM/pod ID 201 | VM/pod name 202 | Related volumes 203 | Label 204 | Label value 205 |
|---|---|---|---|---|
| 1 | DB1 | Volume1, Volume3 | Consistent group | CTG1 |
| 2 | DB2 | Volume2 | Consistent group | CTG1, end |
| ⋮ | ⋮ | ⋮ | ⋮ | ⋮ |

FIG. 2

| Business process ID 301 | Business process name 302 | VM/Pod IDs 303 |
|---|---|---|
| 1 | Sales | 1, 2 |
| 2 | Payment | 1,3 |
| ⋮ | ⋮ | ⋮ |

FIG. 3

| Original site 401 | Business process name 402 | VM/Pod IDs 403 |
|---|---|---|
| Main site | Remote site 1 | 100 Mbps |
| Main site | Remote site 2 | 200 Mbps |
| ⋮ | ⋮ | ⋮ |

FIG. 4

| Business process name | Action |
| --- | --- |
| sales | Create asynchronous copy — 903 |
| payment | Create asynchronous copy — 903 |
| ⋮ | ⋮ |

901: Business process name column
902: Action column

FIG. 9

| Sequence No | Volume name | Volume address | Write data |
|---|---|---|---|
| 1 | Volume1 | 1000 | xxxxxxxxxxxxxx |
| 2 | Volume2 | 2000 | yyyyyyyyyyyyyy |
| 3 | Volume1 | 1500 | xyzxyzxyzxyzxyz |
| ⋮ | ⋮ | ⋮ | ⋮ |

DATA BACKUP SYSTEM AND METHOD WITH DATA CONSISTENCY USING ASYNCHRONOUS DATA COPY

BACKGROUND

Field

The present disclosure is directed to backup storage systems, and more specifically, toward systems and methods for creating consistent backups across multiple data sets, while integrating asynchronous data copy (ADC) technology.

Related Art

Data backup is a core technology for enhancing resilience against system failures. Such failures may be caused by a variety of incidents, including hardware malfunction, software bugs, operational errors, cyber-attacks, and natural disasters. These incidents can inflict severe damage on a system. Data backup protects a system's most important asset, the data itself, which ideally can be fully recovered. However, traditional data backup methods oftentimes lead to issues like diminished online performance and the need for business operations to be suspended. To address the former issue, ADC methods can be employed to mitigate the impact. ADC performs data copying asynchronously with a data write to the original source. That is, the backup data are updated independently of the data write. In this manner, ADC can remove the impact of online performance on business processes. When a system requires storing backup data at remote sites, such as in geometrically distributed cloud systems, where long delays caused by physical distance are inevitable absent the use of ADC. Thus, ADC has become the prevailing method for removing the first factor, especially in cloud-based systems.

Regarding the second challenge, system administrators oftentimes have to halt business operations to perform data backups. For example, banking systems refuse to accept new transactions during scheduled backup times, e.g., at midnight. In database systems, suspending business operations is a requirement for creating consistent backups, meaning that database shutdowns are required for achieving backup consistency.

Furthermore, enterprise systems can include multiple distributed databases that can be managed by a transaction processing monitor (TP monitor). The TP monitor coordinates business processes across multiple resources, such as inventory and payment databases in e-commerce systems. Creating consistent backups across multiple databases is a challenging task for system administrators. Therefore, halting business activities remains a common approach despite its negative effects on business operations.

ADC is the prevailing technology for avoiding degradation of online performance, which can be implemented in a storage system. Some approaches employ a journal volume to record actions and data updates made to the original data. The records stored in the journal volume are copied to the backup site such that the backup data can be updated according to these records.

To achieve consistent backup across multiple data sets, "consistent groups" are established among virtual machines. A consistent group is used for specifying multiple data sets that require data consistency or synchronization to maintain data integrity. In some approaches, multiple data sets are locked prior to backup to ensure consistency among the data sets. However, such approaches are based on the virtual machine layer and necessitate halting data processing.

Currently, the TP monitor method is widely adopted for managing multiple resources. In some approaches, a system with a TP monitor implements transaction processing across multiple data sets. However, such approaches have difficulties in developing consistency among multiple backups or data sets when using ADC. For example, even if data is copied using ADC, it does not guarantee consistent backups across the different data sets. Conversely, approaches capable of producing consistent backups are not integrated with ADC technology. Other approaches that require locking resources before backup lead to interruptions in business operations. Therefore, it is desirable to have systems and methods that integrate ADC with consistency mechanisms, allowing for both efficient ADC and the maintenance of backup consistency across multiple data sets without necessitating a suspension of business operations.

SUMMARY

In some aspects of the disclosure, backup systems and methods create consistent backups across multiple data sets, while integrating ADC technology. To accomplish this, an application group ADC configuring function (APG-ADC configuring function) configures the ADC to ensure that backup data sets remain consistent with those at the original source. Further, the APG-ADC configuring function configures ADC such as to update backup data sets in the same order as the original data sets.

The APG-ADC configuring function receives information about a group of virtual machines and containers. It then identifies the data volumes related to the group and configures the ADC such as to ensure consistency between backup data sets and original data volumes. The process involves, the APG-ADC configuring function extracting the information of the application group from the TP monitor; identifying the data volumes related to the application group; and configuring the ADC to create consistent backup data sets in some APG.

Further, a snapshot function produces backup data sets from the asynchronously copied data sets. Because the APG-ADC configuring function ensures that the update sequence of the backup data sets has the same order as that of the original data sets, the snapshot function can produce the desired consistent backup data sets at the remote site. This ensures that the backups not only reflect the latest data but also maintain data integrity necessary for effective data recovery and management.

Aspects of the present disclosure can involve a system, which can involve means for performing steps comprising: obtaining application group information; obtaining related volumes in a group; and communicating, to an ADC configuration function, a request to create, at a primary site storage, a journal volume that corresponds to a journal volume in a remote site storage; and in response to the primary site storage communicating the journal volume to the remote site storage, creating, based on a set of journal entries in the journal volume, a consistent backup in a backup volume in the remote site storage.

Aspects of the present disclosure can involve a system for copying data from a primary site including one or more server devices and one or more storage devices to a secondary site including one or more storage devices using asynchronous copying, the system including a processor at the one or more server devices, configured to execute an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data.

Aspects of the present disclosure can involve a method for copying data from a primary site including one or more server devices and one or more storage devices to a secondary site including one or more storage devices using asynchronous copying, the method including executing an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data.

Aspects of the present disclosure can involve a system for copying data from a primary site including one or more server devices and one or more storage devices to a secondary site including one or more storage devices using asynchronous copying, the system including means for executing an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data.

Aspects of the present disclosure can involve a non-transitory computer readable medium, storing instructions for copying data from a primary site including one or more server devices and one or more storage devices to a secondary site including one or more storage devices using asynchronous copying, the method including executing an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data.

BRIEF DESCRIPTION OF DRAWINGS

FIG. 2 depicts an example of the VM/container setting table shown in FIG. 1.

FIG. 3 depicts an example of the business process table shown in FIG. 1.

FIG. 4 depicts an example of the network bandwidth table shown in FIG. 1.

FIG. 9 depicts an example of a GUI of the APG-ADC configuration function shown in FIG. 1.

DETAILED DESCRIPTION

Figure 1:
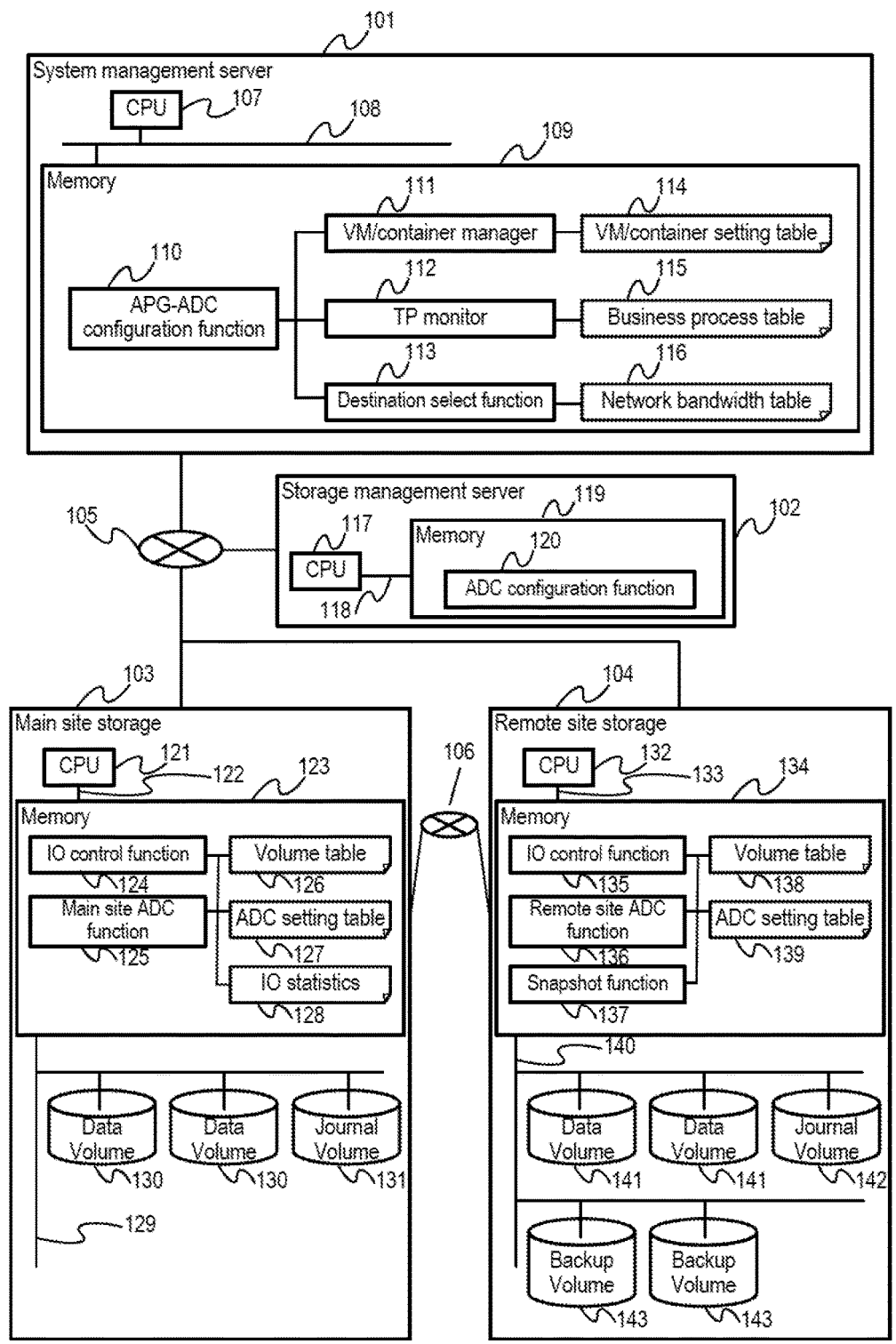
FIG. 1 depicts a block diagram of an exemplary system architecture, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In this document, the terms "primary" and "main," are used interchangeably. Similarly, the terms "service provider," are used interchangeably. The term "consumer" refers to an entity such as an end user. "GUI" and "UI" refer to a graphical user interface.

FIG. 1 depicts a block diagram of an exemplary system architecture, in accordance with an example implementation. As depicted, system 100 comprises system management server 101, storage management server 102, main site storage 103, remote site storage 104, system network 105, and storage network 106. System network 105 connects system management server 101, storage management server 102, main site storage 103, remote site storage 104. Similarly, storage network 106 connects main site storage 103 and remote site storage 104. As depicted, system management server 101 comprises CPU 107, inner network 108, and memory 109 that comprises APG-ADC configuration function 110. APG-ADC configuration function 110, in turn, comprises VM/container manager 111, TP monitor 112, and destination selection function 113 that manages respective VM/container setting table 114, resource group table 115, and network bandwidth table 116.

Storage management server 102 comprises CPU 117, inner network 118, and memory 119, which comprises ADC configuration function 120. In operation, ADC configuration function 120 sets the ADC. Similarly, main site storage 103 comprises CPU 121 inner network 122, and memory 123. As depicted memory 123 comprises IO control function 124, main site ADC function 125, volume table 126, ADC setting table 127, and IO statistics 128. Main site storage 103 further comprises inner storage network 129, data volume 130, and journal volume 131. Remote site storage 104 comprises CPU 132, inner network 133, and memory 134. Memory 134 comprises IO control function 135, remote site ADC function 136, snapshot function 137, volume table 138, and ADC setting table 138. Remote site storage 104 further comprises inner storage network 140, data volume 141, journal volume 141, and backup volume 143.

In operation, APG-ADC configuration function 110 obtains, from at least one of VM/container manager 111 or TP monitor 112, application group information, such as volume data information that associates containers with volumes. APG-ADC configuration function 110 further obtains an appropriate remote site from destination selection function 113. Main site ADC function 125 writes incoming data to data volume 130 and creates journal volume 131, e.g., to update a log in journal volume 131, which corresponds to journal volume 142 in remote site storage 104.

Remote site ADC function 136 applies a log to data volume 141 in remote site storage 104. Snapshot function 137 is a consistent backup in backup volume 143 by halting a volume update and then using a journal log to copy data from data volume 141 to backup volume 143 prior to resuming the volume update.

FIG. 2 depicts an example of the VM/container setting table shown in FIG. 1. VM/container setting table 114 stores volume data information that identifies which container 201 (denoted as VM/pod ID) having a certain name 202 (denoted as VM/Pod name) uses which volume 203 (denoted as related volumes). The VM/pod ID 201 identifies a VM and pod. The VM/pod name 202 is the name of the VM and pod. The related volumes 203 denote data volumes that are used in the VM and pod. As depicted in FIG. 2, a user may tag label 204 and create label value 205. In FIG. 2, VMs/pods 1 and 2 have labels 204 that are tagged as "consistent group." The notation "CTG1" for label value 205 indicates that the VMs/pods DB1 and DB2 require data consistency among them.

FIG. 3 depicts an example of the business process table shown in FIG. 1. Business process table 115 comprises columns for business process ID 301, business process name 302, and VM/pod IDs 303. Business process ID 301 identifies a business process. Business process name 302 is the name of the business process. VM/pod IDs 303 specify those VMs and pods that are used for their respective business processes. In the example in FIG. 3, a backup of business process "sales" requires a consistent backup of VM 1 and VM 2, which, as indicated in FIG. 2, uses volumes 1-3 that should be consistent.

FIG. 4 depicts an example of the network bandwidth table shown in FIG. 1. It includes information about original site 401, destination site 402, and network bandwidth 403. Network bandwidth 403 comprises information about the network bandwidth needed to transfer data from original site 401 and destination site 402. As depicted, network bandwidth 403 for remote site 1 is 100 Mbps and network bandwidth 403 for remote site 2 is 200 Mbps. Advantageously, such data transfer information can be used to select an appropriate destination backup site.

Figure 5:
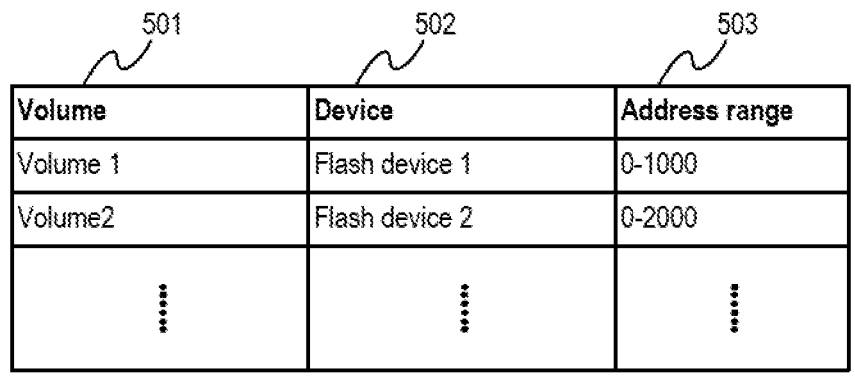
FIG. 5 depicts an example of volume tables in the main and remote site storage shown in FIG. 1.

FIG. 5 depicts an example of volume tables in the main and remote site storage shown in FIG. 1. Volume tables 126 and 138 include volume 501, device 502, and address range 503. The table in FIG. 5 specifies the device that stores data for the volume. For example, the data in volume 1 are stored at an address range from 0 to 1000 within flash device 1.

Figure 6:
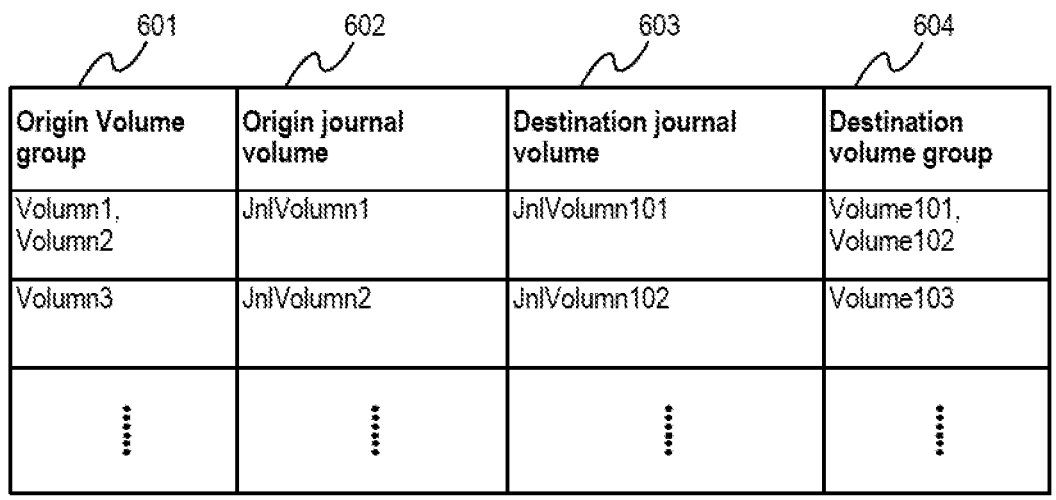
FIG. 6 depicts an example of ADC setting tables in the main and remote site storage shown in FIG. 1.

FIG. 6 depicts an example of ADC setting tables in the main and remote site storage shown in FIG. 1. Tables 127 and 139 specify the volume group of ADC and the journal volumes used for ADC, i.e., which volume group can use which journal volume to be asynchronously copied to a remote site. For example, in FIG. 6, volumes 1 and 2 are asynchronously copied to a volume 101 and a volume 102 using journal volume 1 and journal volume 101.

Figure 7:
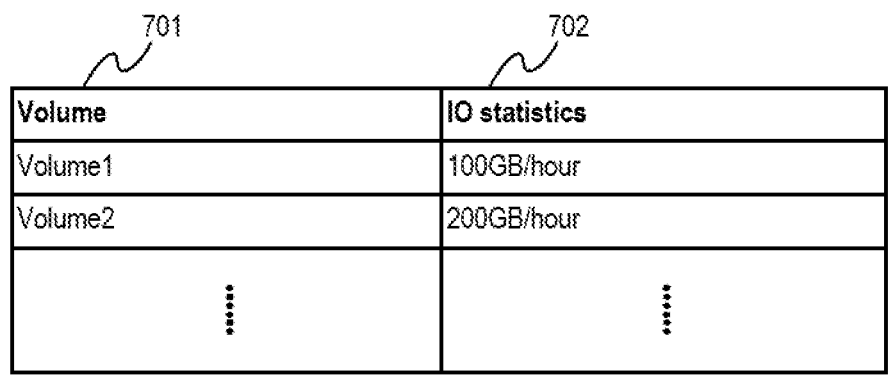
FIG. 7 depicts an example of the IO statistics table in the main site storage shown in FIG. 1.

FIG. 7 depicts an example of the IO statistics table in the main site storage shown in FIG. 1. Table 128 in FIG. 7 indicates that particular volumes 701, volumes 1 and 2, can be accessed at certain IO statistics 702, here, throughput rates of 100 GB per hour and 200 GB per hour, respectively.

Figure 8:
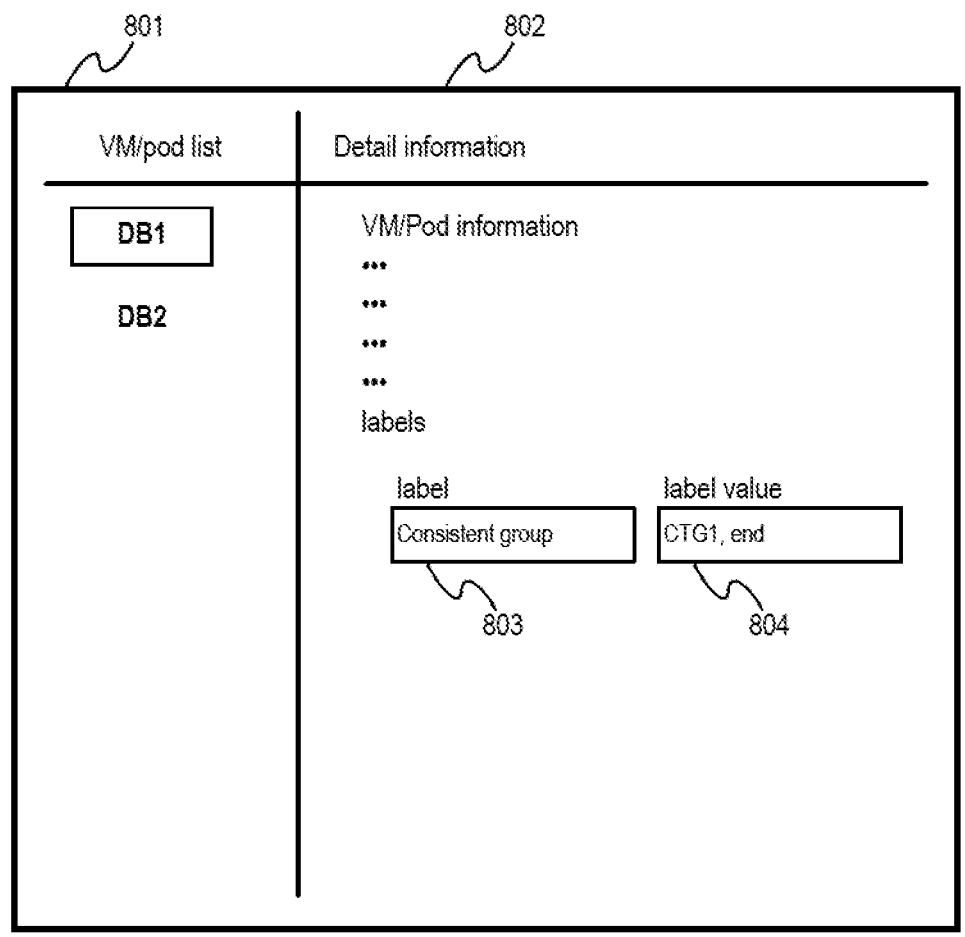
FIG. 8 illustrates an example of a graphical user interface (GUI) of the VM/container manager shown in FIG. 1.

FIG. 8 illustrates an example of a graphical user interface (GUI) of the VM/container manager shown in FIG. 1. A user may use the shown GUI for VM/container manager 111, for example, to assign labels 803 and label values 804 to a VM/pod. In FIG. 8, label 803, denoted as "consistent group," and label value 804, denoted as "CTG1, end," are associated with VM/pod "DB1." As a result, the VM or pod DB1 is assigned to the consistent group. The marker "end" indicates that all the VMs and pods in the group have already been labeled. These inputs are reflected in VM/container setting table 114 (shown in FIG. 1).

FIG. 9 depicts an example of a GUI of the APG-ADC configuration function shown in FIG. 1. APG-ADC configuration function 110 is displayed in the flowchart of FIG. 10. As depicted in FIG. 9, a user can click a button labeled "create asynchronous copy" to perform an action 902 such as communicating the instruction "create asynchronous copy," to an ADC that is included in the VMs/pods in business process 901.

Figure 10:
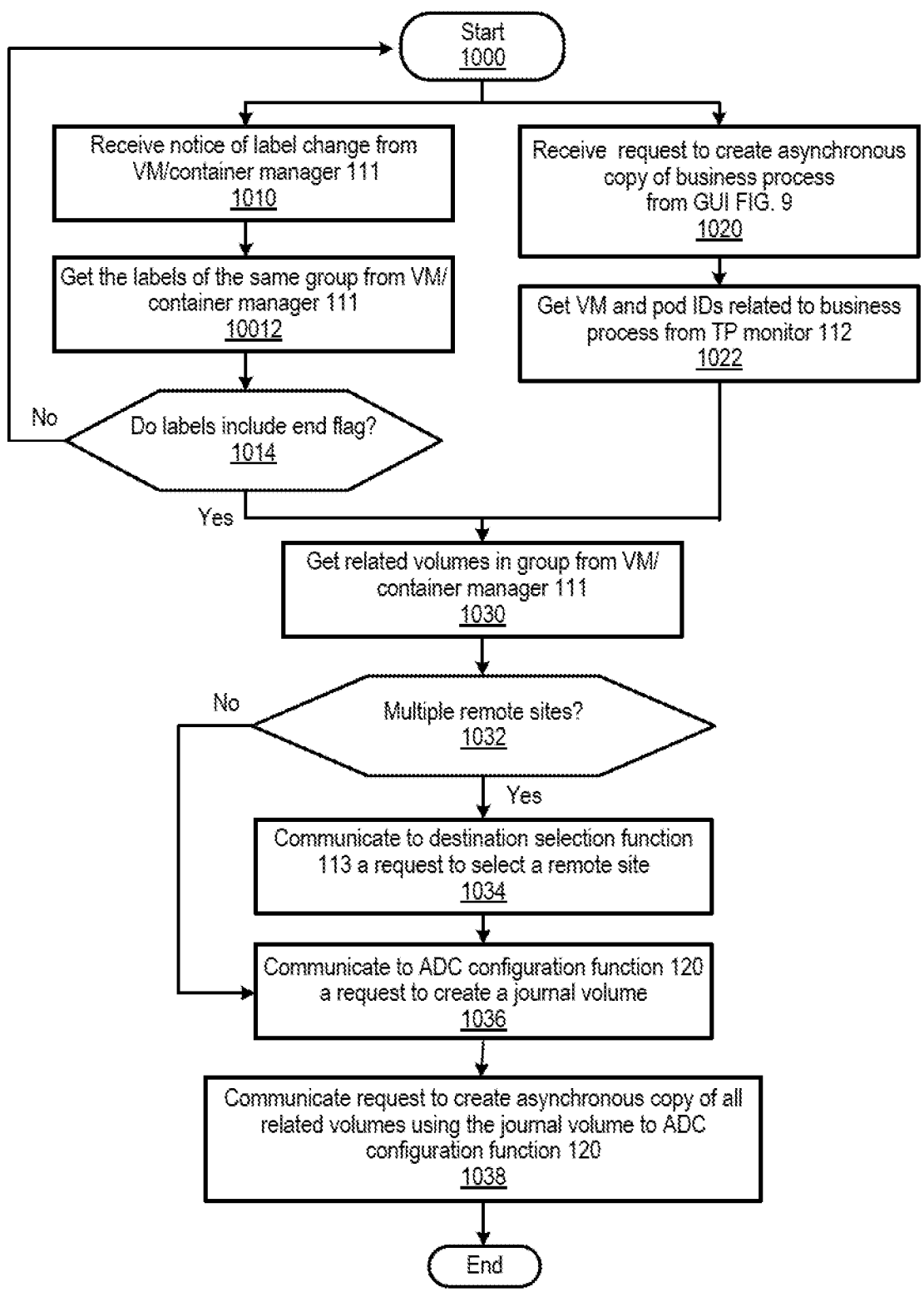
FIG. 10 is a flowchart illustrating an example process for the APG-ADC configuration function shown in FIG. 1.

FIG. 10 is a flowchart illustrating an example process for the APG-ADC configuration function shown in FIG. 1. APG-ADC configuration function 110 displays, e.g., the GUI in FIG. 9, and receives user input. Further, APG-ADC configuration function 110 receives notification of label changes from VM/container manager 111 (shown in FIG. 1). The process in FIG. 10 starts, at step 1000, with a dual VM-based input (left path) and an application-level input (right path).

For VM-based inputs, at step 1010, a notice of label change is received from VM/container manager 111. At step 1012, labels of the same application group are obtained from VM/container manager 111. These group labels may have been user-configured and identify consistent groups. At step 1014, it is determined whether the label value of the obtained label includes an end flag. If so, the process returns to start 1000. Otherwise, the process resumes with step 1030, at which related volumes 203 (shown in FIG. 2) in the application group are obtained from VM/container manager 111.

For the application-level inputs, at step 1020, a request to create an asynchronous copy of a business process is received, e.g., from the GUI shown in FIG. 9. VM and pod IDs related to the business process are obtained from TP monitor 112, and the process resumes with step 1030. At step 1032, it is determined whether the system has multiple remote sites. If so, the system continues with step 1034, at which a request to select an appropriate remote site as backup site, e.g., by using destination selection function 113, is generated. Otherwise, the process directly resumes with step 1036, at which the request to create a journal volume to the ADC configuration function 120 in storage management server 102 is generated. Finally, a request to generate an asynchronous copy of all related volumes using the journal volume to the ADC configuration function 120 is generated.

Figure 11:
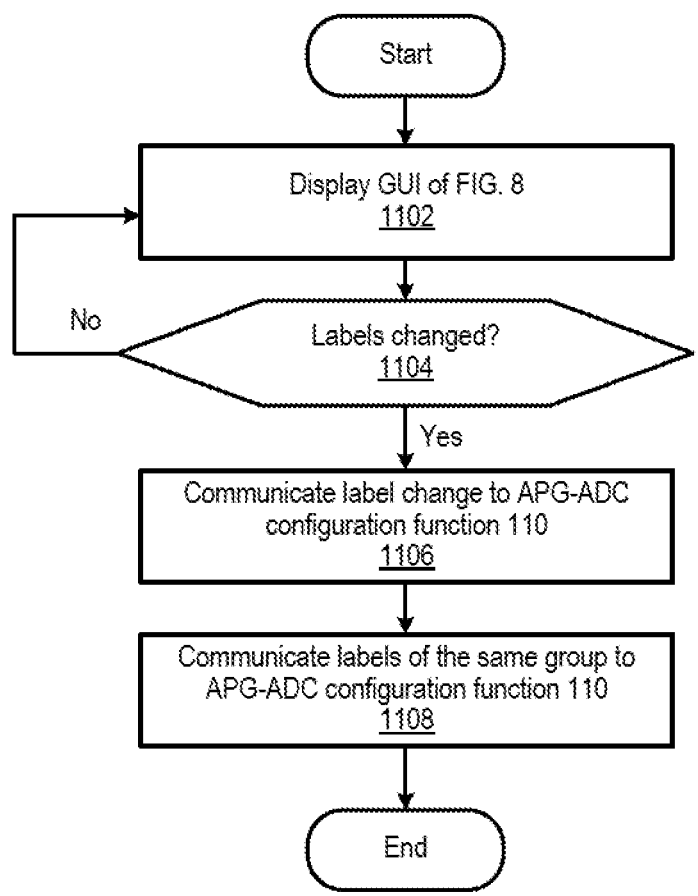
FIG. 11 is a flowchart illustrating an example process for the VM/container manager shown in FIG. 1.

FIG. 11 is a flowchart illustrating an example process for the VM/container manager shown in FIG. 1. The process in FIG. 11 starts, at step 1102, when the VM/container manager 111 displays a GUI such as that shown in FIG. 8, e.g., in response to receiving user input. At step 1104, is determined whether all labels have changed by the user. If not, at step 1104, the process returns to the GUI step 1102. Otherwise, at step 1106, a notification of the label change is communicated to APG-ADC configuration function 110. And, at step 1108, a notification of all the labels of the same group is communicated to APG-ADC configuration function 110.

Figure 12:
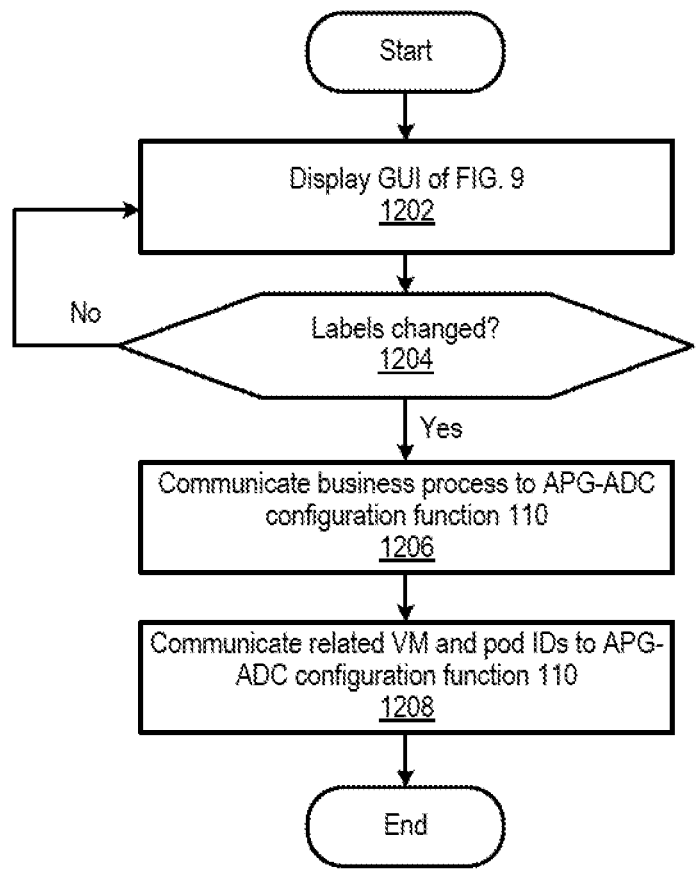
FIG. 12 is a flowchart illustrating an example process for the TP monitor shown in FIG. 1.

FIG. 12 is a flowchart illustrating an example process for the TP monitor shown in FIG. 1. The process in FIG. 12 starts, at step 1202, when the VM/container manager 111 displays a GUI such as that shown in FIG. 9. At step 1204, it is determined whether all labels have been changed by the user. If not, at step 1204, the process returns to the GUI. Otherwise, at step 1206, the TP monitor 112 communicated the business process to the APG-ADC configuration function 110. And, at step 1208, the TP monitor 112 communicates the related VM and pod IDs to the APG-ADC configuration function 110 which responds to the requests from the APG-ADC configuration function 110.

Figure 13:
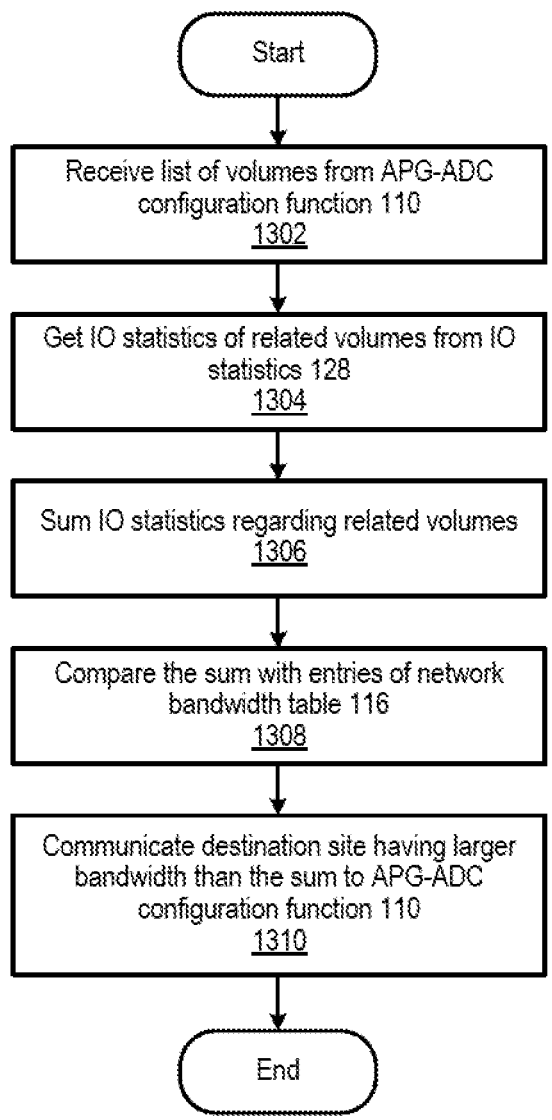
FIG. 13 is a flowchart illustrating an example process for the destination selection function shown in FIG. 1.

FIG. 13 is a flowchart illustrating an example process for the destination selection function shown in FIG. 1. Destination selection function 113 procedure starts at step 1302 when destination selection function 113 receives the list of volumes from APG-ADC configuration function 110. In step 1304, IO statistics of the related volumes are obtained from IO statistics 128. At step 1306, the IO statistics regarding related volumes are summed up. At step 1308, the sum is compared with entries of the network bandwidth table 116. Finally, at step 1310, the destination site that has a larger bandwidth than that sum is communicated to APC-ADC configuration function 110, such that destination selection function 113 can select a proper backup site based on backup rate and transfer rate.

Figure 14:
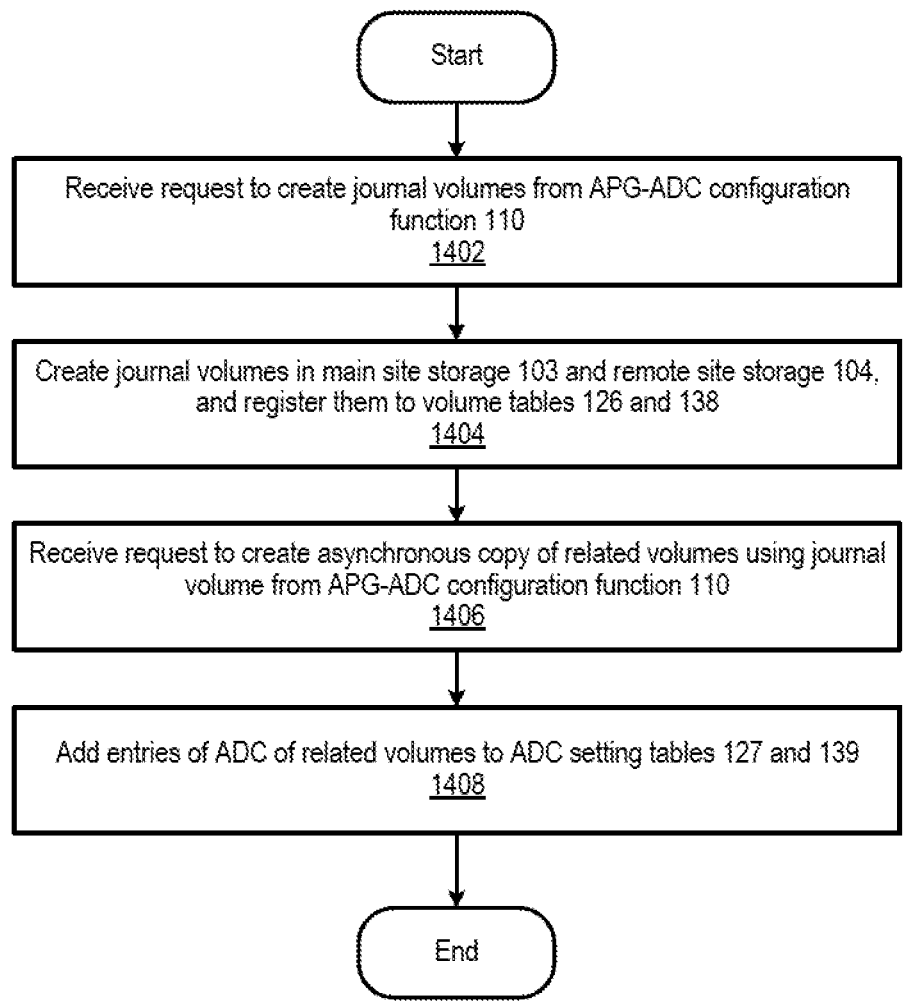
FIG. 14 is a flowchart illustrating an example process for the ADC configuration function shown in FIG. 1.

FIG. 14 is a flowchart illustrating an example process for the ADC configuration function shown in FIG. 1. The process for ADC configuration function 120 in storage management server 102 starts, at step 1402, when ADC configuration function 120 receives a request to create journal volumes from APG-ADC configuration function 110 in system management server 101. At step 1404, ADC configuration function 120 receives a request to create journal volumes in main site storage 103 and remote site storage 104 and to register them to respective volume tables 126 and 138. At step 1406, ADC configuration function 120 receives a request to create an asynchronous copy of all related volumes using the journal volume from APG-ADC configuration function 110. At step 1408, ADC entries for all related volumes are added to ADC setting tables 127 and 139 in main site storage 103 and remote site storage 104, respectively.

Figure 15:
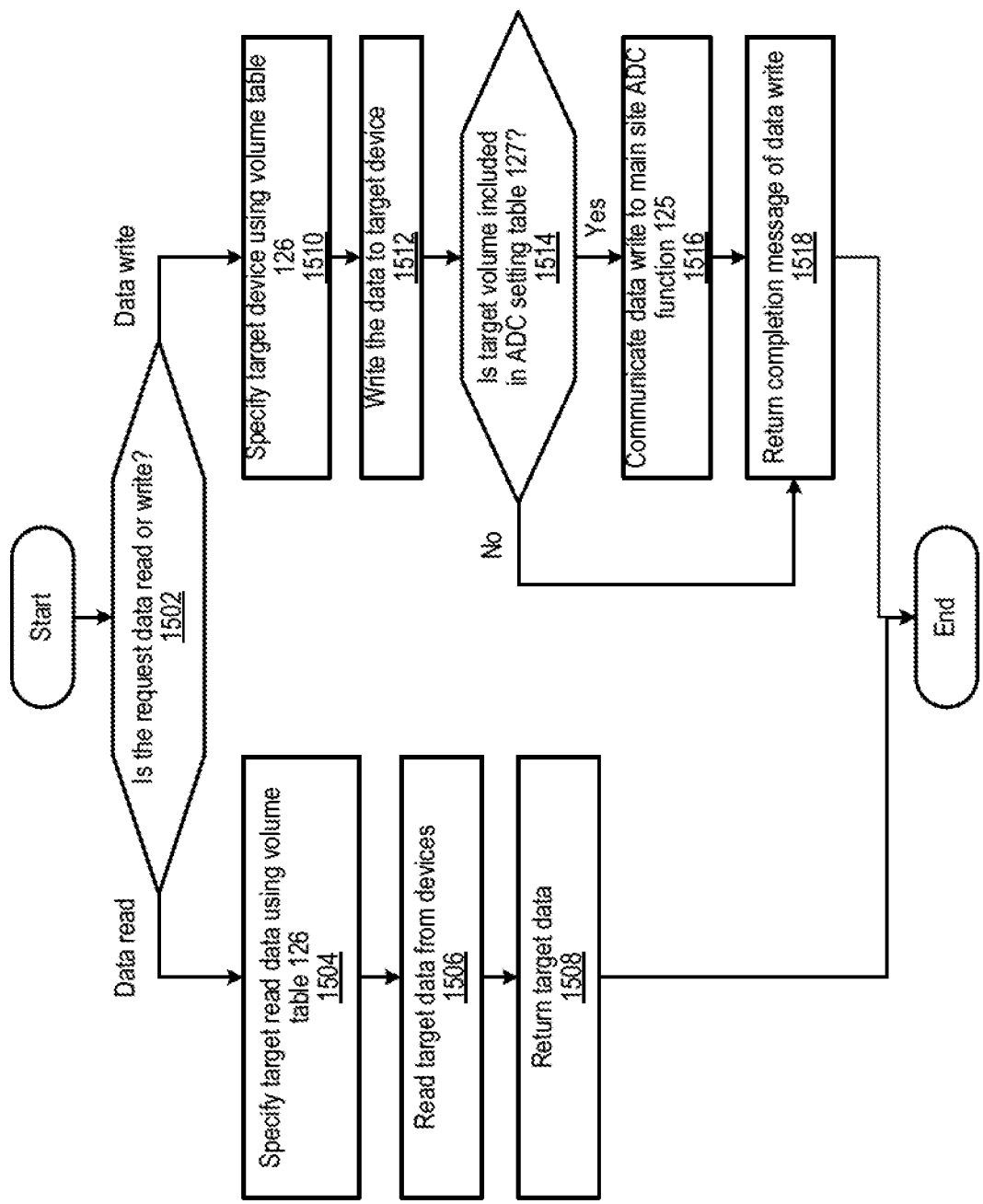
FIG. 15 is a flowchart illustrating an example process for the IO control function 124.

FIG. 15 is a flowchart illustrating an example process for the IO control function 124. The process for IO control function 124 starts at step 1502 when IO control function 124 receives either a read data request or a write data request from a user. For read data requests, at step 1504, the target read data is specified using volume table 126. At step 1506, the target data is read from devices and returned at step 1508. For write data requests, at step 1510, the target device is specified using volume table 126. At step 1512, the data is written to the target device. At step 1514, it is determined whether the target volume is included in ADC setting table 127. If so, at step 1516, the data write is communicated to the main site ADC function 125, and the process continues with step 1518, when a message indicating the completion of the data right is returned. If at step 1514, it is determined that the target volume is not included in ADC setting table 127, the process directly returns the completion message at step 1518, e.g., such that ADC function 125 can update journal volume 131 shown in FIG. 1.

Figures 16, 17:
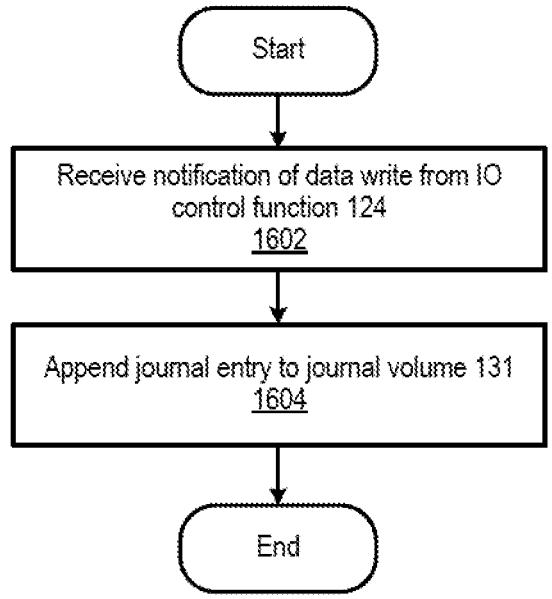
FIG. 16 is a flowchart illustrating an example process for the main site ADC function shown in FIG. 1.
FIG. 17 illustrates an example of journal entries stored in a journal volume.

FIG. 16 is a flowchart illustrating an example process for the main site ADC function shown in FIG. 1. The process for main site ADC function 125 starts at step 1602 when the main site ADC function receives the notification of the data write from IO control function 124. At step 1604, a journal entry is appended to journal volume 131, shown in FIG. 17.

FIG. 17 illustrates an example of journal entries stored in a journal volume. Journal volume 131 is generated by main site ADC function 125 (both shown in FIG. 1). As depicted, Journal volume 131 comprises columns sequence number, volume name, volume address, and the written data.

Figure 18:
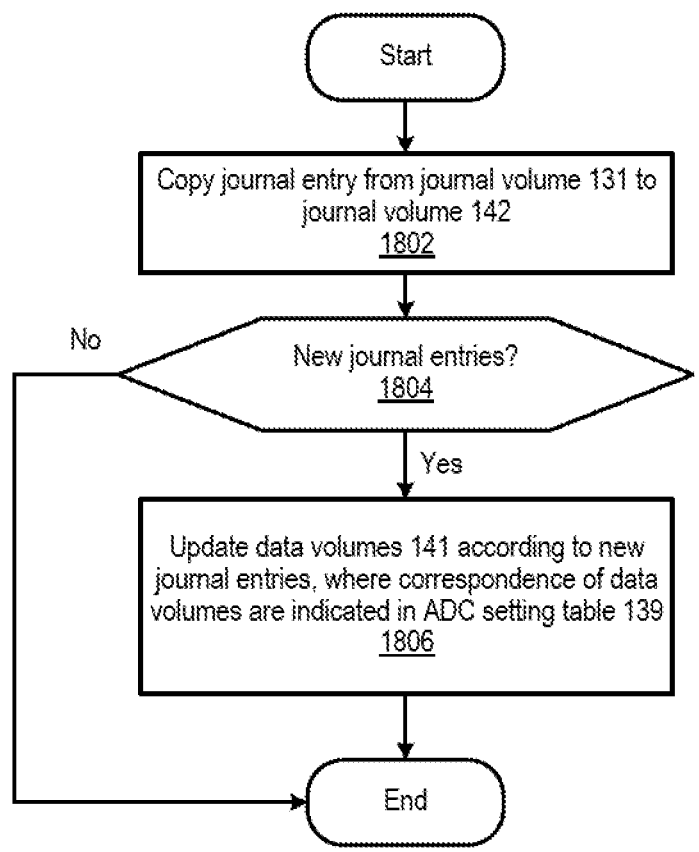
FIG. 18 is a flowchart illustrating an example process for the remote site ADC function shown in FIG. 1.

FIG. 18 is a flowchart illustrating an example process for the remote site ADC function shown in FIG. 1. The process for remote site ADC function 136 starts at step 1802, e.g., periodically every 1 or 10 seconds, when the journal entry is copied from journal volume 131 site storage 103 to journal volume 142 in remote site storage 104. At step 1804, it is determined whether new journal entries exist. If so, data volumes 141 are updated according to the new journal entries, where the correspondence of the data volumes is indicated in the ADC setting table 139 and the process ends at step 1808. Otherwise, if no new journal entries exist at step 1804, the process directly ends at step 1808.

Figure 19:
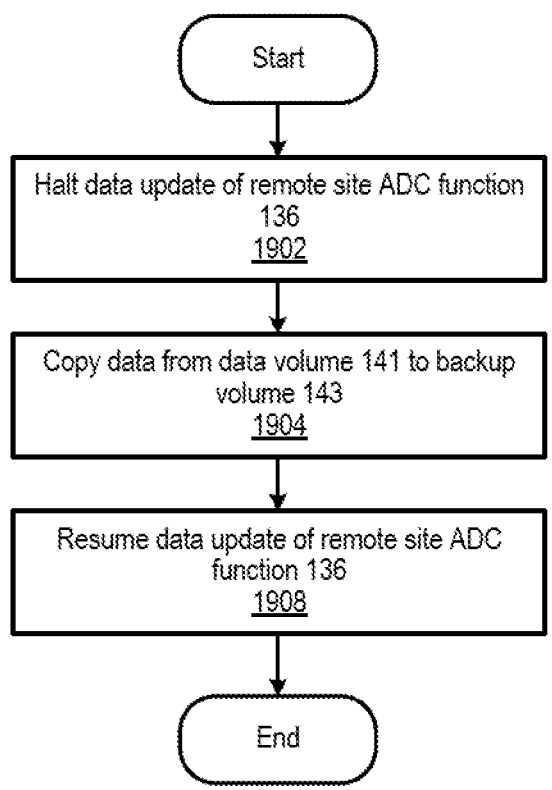
FIG. 19 is a flowchart illustrating an example process for the snapshot function shown in FIG. 1.

FIG. 19 is a flowchart illustrating an example process for the snapshot function shown in FIG. 1. The process for snapshot function 137 starts at step 1902 when snapshot function 137 suspends the data update of the remote side ADC function 136. At step 1904, all the data from data volume 141 are copied to backup volume 143. At step 1906, the process resumes with a data update of the remote site ADC function 136.

Figure 20:
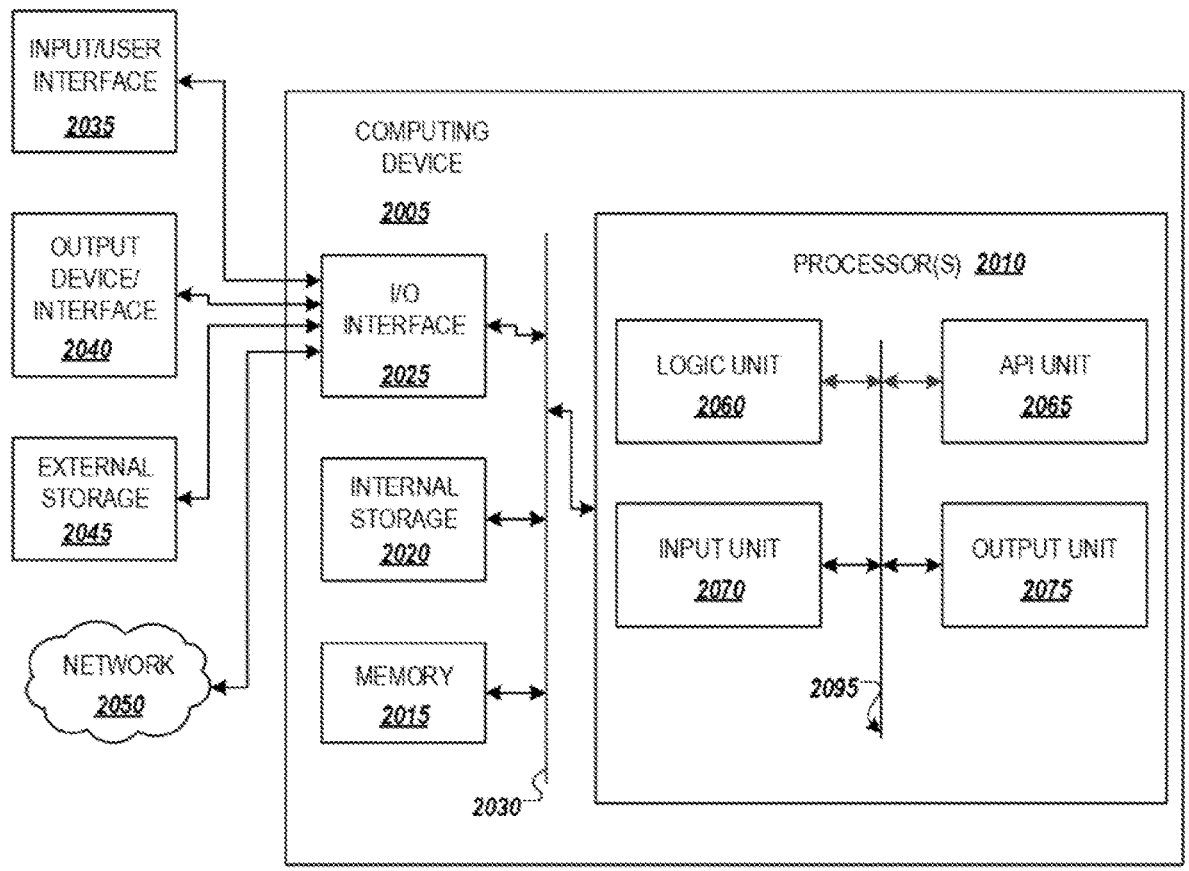
FIG. 20 illustrates an example computing environment with an example computer device suitable for use in some example implementations.

FIG. 20 illustrates an example computing environment with an example computer device suitable for use in some example implementations, such as system management server 101, storage management server 102, main site storage 103, remote site storage 104, system network 105, and storage network 106 shown in FIG. 1.

Computer device 2005 in computing environment 2000 can include one or more processing units, cores, or processors 2010, memory 2015 (e.g., RAM, ROM, and/or the like), internal storage 2020 (e.g., magnetic, optical, solid-state storage, and/or organic), and/or I/O interface 2025, any of which can be coupled on a communication mechanism or bus 2030 for communicating information or embedded in the computer device 2005. I/O interface 2025 is also configured to receive images from cameras or provide images to projectors or displays, depending on the desired implementation.

Computer device 2005 can be communicatively coupled to input/user interface 2035 and output device/interface 2040. Either one or both of input/user interface 2035 and output device/interface 2040 can be a wired or wireless interface and can be detachable. Input/user interface 2035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 2040 may include a display, television, monitor, printer, speaker, braille, or the like. In some example implementations, input/user interface 2035 and output device/interface 2040 can be embedded with or physically coupled to the computer device 2005. In other example implementations, other computer devices may function as or provide the functions of input/user interface 2035 and output device/interface 2040 for a computer device 2005.

Examples of computer device 2005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 2005 can be communicatively coupled (e.g., via I/O interface 2025) to external storage 2045 and network 2050 for communicating with any number of networked components, devices, and systems, including one or more computer devices of the same or different configuration. Computer device 2005 or any connected computer device can be functioning as, providing services of, or referred to as a server, client, thin server, general machine, special-purpose machine, or another label.

I/O interface 2025 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 2000. Network 2050 can be any network or combination of networks (e.g., the Internet, local area network, wide area network, a telephonic network, a cellular network, a satellite network, and the like).

Computer device 2005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 2005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 2010 can execute under any operating system (OS) (not shown), in a native or virtual environment. One or more applications can be deployed that include logic unit 2060, application programming interface (API) unit 2065, input unit 2070, output unit 2075, and inter-unit communication mechanism 2095 for the different units to communicate with each other, with the OS, and with other applications (not shown). The described units and elements can be varied in design, function, configuration, or implementation and are not limited to the descriptions provided. Processor(s) 2010 can be in the form of hardware processors such as central processing units (CPUs) or in a combination of hardware and software units.

In some example implementations, when information or an execution instruction is received by API unit 2065, it may be communicated to one or more other units (e.g., logic unit 2060, input unit 2070, output unit 2075). In some instances, logic unit 2060 may be configured to control the information flow among the units and direct the services provided by API unit 2065, input unit 2070, output unit 2075, in some example implementations described above. For example, the flow of one or more processes or implementations may be controlled by logic unit 2060 alone or in conjunction with API unit 2065. The input unit 2070 may be configured to obtain input for the calculations described in the example implementations, and the output unit 2075 may be configured to provide output based on the calculations described in example implementations.

Processor(s) 2010 can be configured to execute a method or computer instructions which can involve, performing steps of an APG-ADC configuration function as described with reference to FIG. 10; steps of a VM/container manager, as described with reference to FIG. 11; steps of a TP monitor, as described with reference to FIG. 12; steps of a destination selection function, as described with reference to FIG. 13; steps of an ADC configuration function, as described with reference to FIG. 14; steps of an IO control function, as described with reference to FIG. 15; steps of a main site ADC function, as described with reference to FIG. 16; steps of a remote site ADC function, as described with reference to FIG. 18; and steps of a snapshot function, as described with reference to FIG. 19.

Processor(s) 2010 can be configured to execute an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data.

Depending on the desired implementation, the input of the application group information can be provided from a group of virtual machines and containers obtained from a virtual machine/container manager that is configured to manage the virtual machines and the containers in the primary site.

Depending on the desired implementation, the input of the application group information is provided from an executed process obtained from an executed transaction processing monitor configured to manage the executed process with virtual machines and containers in the primary site.

Depending on the desired implementation, the asynchronous copying can be set through a primary site ADC configuration function executed on one or more storage devices of the primary site and a remote site ADC configuration function executed on the one or more storage devices in the remote site, wherein the primary site ADC configuration function is configured to conduct a data update in a consistent group to a journal volume in the primary site, and wherein the remote site ADC configuration function updates data volumes in the remote site according to an journal entry in the journal volume.

Depending on the desired implementation, the backup volumes are created by a snapshot function configured to suspend the data update of the remote site ADC function and copy data volumes to backup volumes.

Depending on the desired implementation, a copy destination is selected by a destination select function, which selects the destination through comparing a sum of data throughput of consistent group and network bandwidth between the primary site and the remote site.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as, but not limited to optical disks, magnetic disks, read-only memories, random access memories, solid-state devices and drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A system for copying data from a primary site including one or more server devices and one or more storage devices to a secondary site including one or more storage devices using asynchronous copying, the system comprising:
    a processor at the one or more server devices, configured to execute an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data;
    wherein the asynchronous copying is set through a primary site ADC configuration function executed on one or more storage devices of the primary site and a remote site ADC configuration function executed on the one or more storage devices in the remote site, wherein the primary site ADC configuration function is configured to conduct a data update in a consistent group to a journal volume in the primary site, and wherein the remote site ADC configuration function updates data volumes in the remote site according to an journal entry in the journal volume;
    wherein backup volumes are created by a snapshot function configured to suspend the data update of the remote site ADC function and copy data volumes to backup volumes;
    wherein a copy destination is selected by a destination select function, which selects the destination through comparing a sum of data throughput of consistent group and network bandwidth between the primary site and the remote site.

2. The system of claim 1, wherein the input of the application group information is provided from a group of virtual machines and containers obtained from a virtual machine/container manager that is configured to manage the virtual machines and the containers in the primary site.

3. The system of claim 1, wherein the input of the application group information is provided from an executed process obtained from an executed transaction processing monitor configured to manage the executed process with virtual machines and containers in the primary site.

4. A method for copying data from a primary site including one or more server devices and one or more storage devices to a secondary site including one or more storage devices using asynchronous copying, the method comprising:
    executing an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data;

wherein the asynchronous copying is set through a primary site ADC configuration function executed on one or more storage devices of the primary site and a remote site ADC configuration function executed on the one or more storage devices in the remote site, wherein the primary site ADC configuration function is configured to conduct a data update in a consistent group to a journal volume in the primary site, and wherein the remote site ADC configuration function updates data volumes in the remote site according to an journal entry in the journal volume;

wherein backup volumes are created by a snapshot function configured to suspend the data update of the remote site ADC function and copy data volumes to backup volumes;

wherein a copy destination is selected by a destination select function, which selects the destination through comparing a sum of data throughput of consistent group and network bandwidth between the primary site and the remote site.

5. The method of claim 4, wherein the input of the application group information is provided from a group of virtual machines and containers obtained from a virtual machine/container manager that is configured to manage the virtual machines and the containers in the primary site.

6. The method of claim 4, wherein the input of the application group information is provided from an executed process obtained from an executed transaction processing monitor configured to manage the executed process with virtual machines and containers in the primary site.

7. A non-transitory computer readable medium, storing instructions for copying data from a primary site including one or more server devices and one or more storage devices to a secondary site including one or more storage devices using asynchronous copying, the instructions comprising:

executing an application group asynchronous data copy (APG-ADC) configuration function that sets an asynchronous copying of group data from an input of application group information, wherein the APG-ADC configuration function sets the asynchronous copying of the grouped data so as to maintain an update order of the grouped data;

wherein the asynchronous copying is set through a primary site ADC configuration function executed on one or more storage devices of the primary site and a remote site ADC configuration function executed on the one or more storage devices in the remote site, wherein the primary site ADC configuration function is configured to conduct a data update in a consistent group to a journal volume in the primary site, and wherein the remote site ADC configuration function updates data volumes in the remote site according to an journal entry in the journal volume;

wherein backup volumes are created by a snapshot function configured to suspend the data update of the remote site ADC function and copy data volumes to backup volumes;

wherein a copy destination is selected by a destination select function, which selects the destination through comparing a sum of data throughput of consistent group and network bandwidth between the primary site and the remote site.

8. The non-transitory computer readable medium of claim 7, wherein the input of the application group information is provided from a group of virtual machines and containers obtained from a virtual machine/container manager that is configured to manage the virtual machines and the containers in the primary site.

9. The non-transitory computer readable medium of claim 7, wherein the input of the application group information is provided from an executed process obtained from an executed transaction processing monitor configured to manage the executed process with virtual machines and containers in the primary site.

* * * * *